United States Patent
Pfohl et al.

(10) Patent No.: US 8,063,505 B2
(45) Date of Patent: Nov. 22, 2011

(54) KEYLESS IGNITION

(75) Inventors: Kevin Lee Pfohl, Potosi, WI (US); Gary Honey, Dubuque, IA (US); Travis Blackbourn, Kieler, WI (US); Scott Breiner, Dubuque, IA (US); Alvaro Forero, Cedar Falls, IA (US); Dan Pflieger, East Dubuque, IL (US)

(73) Assignee: Deere & Company, Moline, IL (US)

( * ) Notice: Subject to any disclaimer, the term of this patent is extended or adjusted under 35 U.S.C. 154(b) by 866 days.

(21) Appl. No.: 11/872,458

(22) Filed: Oct. 15, 2007

(65) Prior Publication Data

US 2009/0095603 A1 Apr. 16, 2009

(51) Int. Cl.
*B60R 25/04* (2006.01)

(52) U.S. Cl. .................... 307/10.3; 307/10.6

(58) Field of Classification Search ............ 307/10.6
See application file for complete search history.

(56) References Cited

U.S. PATENT DOCUMENTS

| | | | |
|---|---|---|---|
| 5,883,444 A | 3/1999 | Hirata et al. | |
| 6,727,800 B1 | 4/2004 | Dutu | |
| 6,963,272 B1 * | 11/2005 | Flick | 340/426.24 |
| 7,222,006 B2 * | 5/2007 | Proefke et al. | 701/32 |
| 2004/0124708 A1 | 7/2004 | Giehler | |
| 2004/0227642 A1 | 11/2004 | Giles et al. | |
| 2007/0038355 A1 | 2/2007 | Brandt et al. | |

OTHER PUBLICATIONS

European Search report for Serial No. 08/727,138.3, dated Dec. 6, 2010. (7 pages).

* cited by examiner

*Primary Examiner* — Rexford Barnie
*Assistant Examiner* — Dru Parries
(74) *Attorney, Agent, or Firm* — Taylor IP, P.C.

(57) ABSTRACT

An engine start system for use with a ground engaging vehicle, the system including an input device, a processing circuit, a display and an engine controller unit. The input device produces a signal when depressed, the signal initiates the application of electrical power to the engine start system. The processing circuit is activated by the application of electrical power thereto. The display is communicatively coupled with the processing circuit. The input device produces another signal when depressed. The other signal is detected by the processing circuit and the processing circuit, in response to the other signal, sends either a PIN request notice to the display or a start signal to the engine controller unit.

20 Claims, 6 Drawing Sheets

| OPERATOR PINS |
|---|
| 1 - XXXX |
| 2 - XXXX |
| 3 - XXXX |
| 4 – XXXX |
| 5 – XXXX |
| PINS 6 -10 |

Fig. 7

# KEYLESS IGNITION

FIELD OF THE INVENTION

This invention relates to a keyless ignition system, and, more particularly, to a keyless ignition system for a ground engaging vehicle.

BACKGROUND OF THE INVENTION

Starting systems for internal combustion engines have existed for over one hundred years. Some internal combustion engines are started by simply hand rotation of the rotating component. Early automobiles had a mechanical starting system including a starting crank that was rotated by the operator of the car in order to start the engine. Electrical starting systems have included a physical engaging lever or pedal in which the act of engaging the starting gear also activated an electrical circuit to supply power to rotate the electrical motor thereby rotating the engine at sufficient speed to start the internal combustion engine.

In order to improve the security of the vehicle and prevent theft a key system was developed requiring the operator to have a key that would match the lock prior to the use of the system that would start the internal combustion engine.

In a typical starting system the key is placed into an ignition position, which causes battery voltage to be supplied to an ignition relay coil from the key switch, which energizes the coil to provide battery voltage to the ignition system. As the key is turned to the start position, battery voltage is supplied to the starter relay coil, which energizes the coil and provides battery voltage to the engine starter. The key switch is a single point failure for turning on ignition power, cranking over the engine and for continued supply of ignition power to the machine. The circuit provides no system diagnostics or feedback when it fails, which can create excessive downtime for the machine. If the machine is running and the key switch fails, ignition power is removed and the machine will be shut down.

What is needed in the art is a starting system that reduces down time and is more efficient and less expensive to manufacture.

SUMMARY OF THE INVENTION

The invention, in one form thereof, is directed to an engine start system for use with a ground engaging vehicle, the system including an input device, a processing circuit, a display and an engine controller unit. The input device produces a signal when depressed, the signal initiates the application of electrical power to the engine start system. The processing circuit is activated by the application of electrical power thereto. The display is communicatively coupled with the processing circuit. The input device produces another signal when depressed. The other signal is detected by the processing circuit and the processing circuit, in response to the other signal, sends either a PIN request notice to the display or a start signal to the engine controller unit.

BRIEF DESCRIPTION OF THE DRAWINGS

FIGS. 5-7 are displays used in the management of the keyless ignition system of FIGS. 1-4.

DETAILED DESCRIPTION OF THE INVENTION

Figure 1:
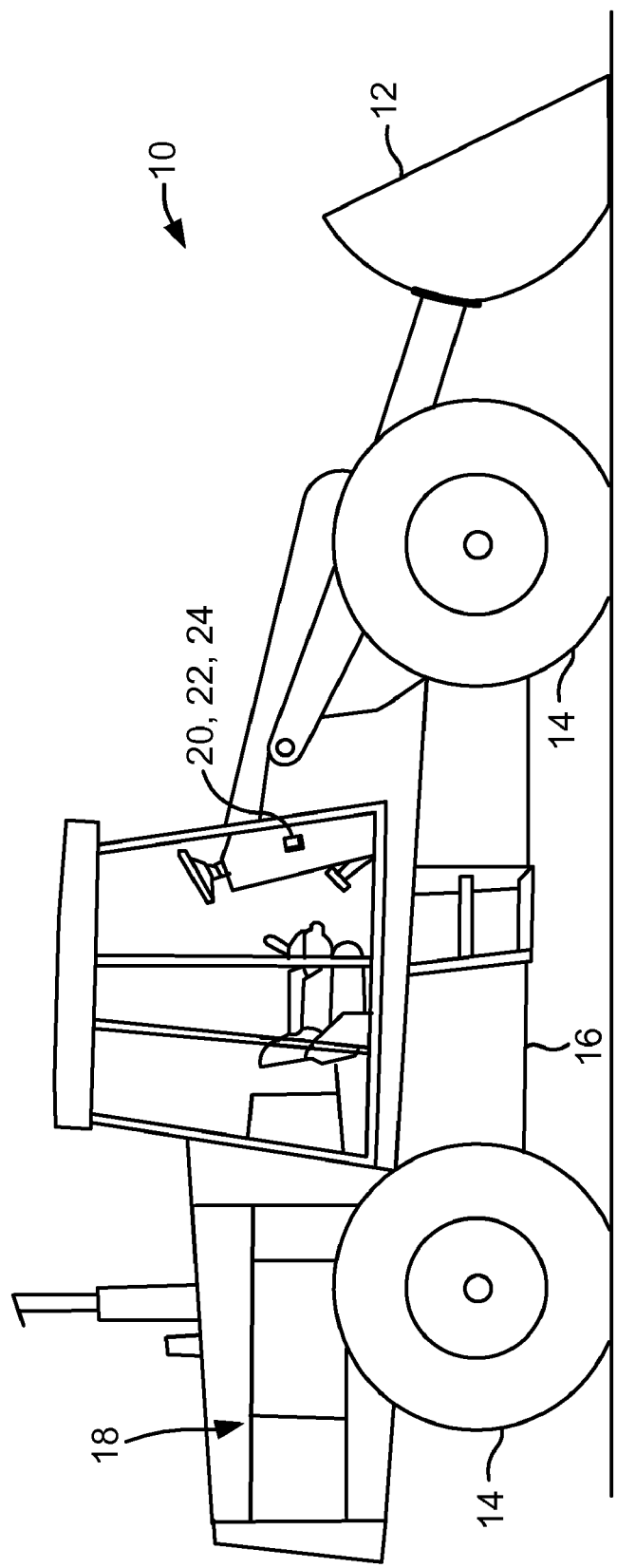
FIG. 1 is a schematicized side view of a loader utilizing an embodiment of the keyless ignition system of the present invention.

Referring now to the drawings, and more particularly to FIG. 1, there is shown a ground engaging vehicle 10, which may be in the form of a loader 10. Loader 10 includes a bucket 12, wheels 14 that engage the ground that are connected to a frame 16 with an engine 18. Engine 18 provides motive force for the movement of loader 10 and generates electricity for the use of control system 20. Control system 20 may be distributed across different portions of loader 10 with portions in the cab of loader 10 so that an operator may access the controls for the control of loader 10.

Figure 2:
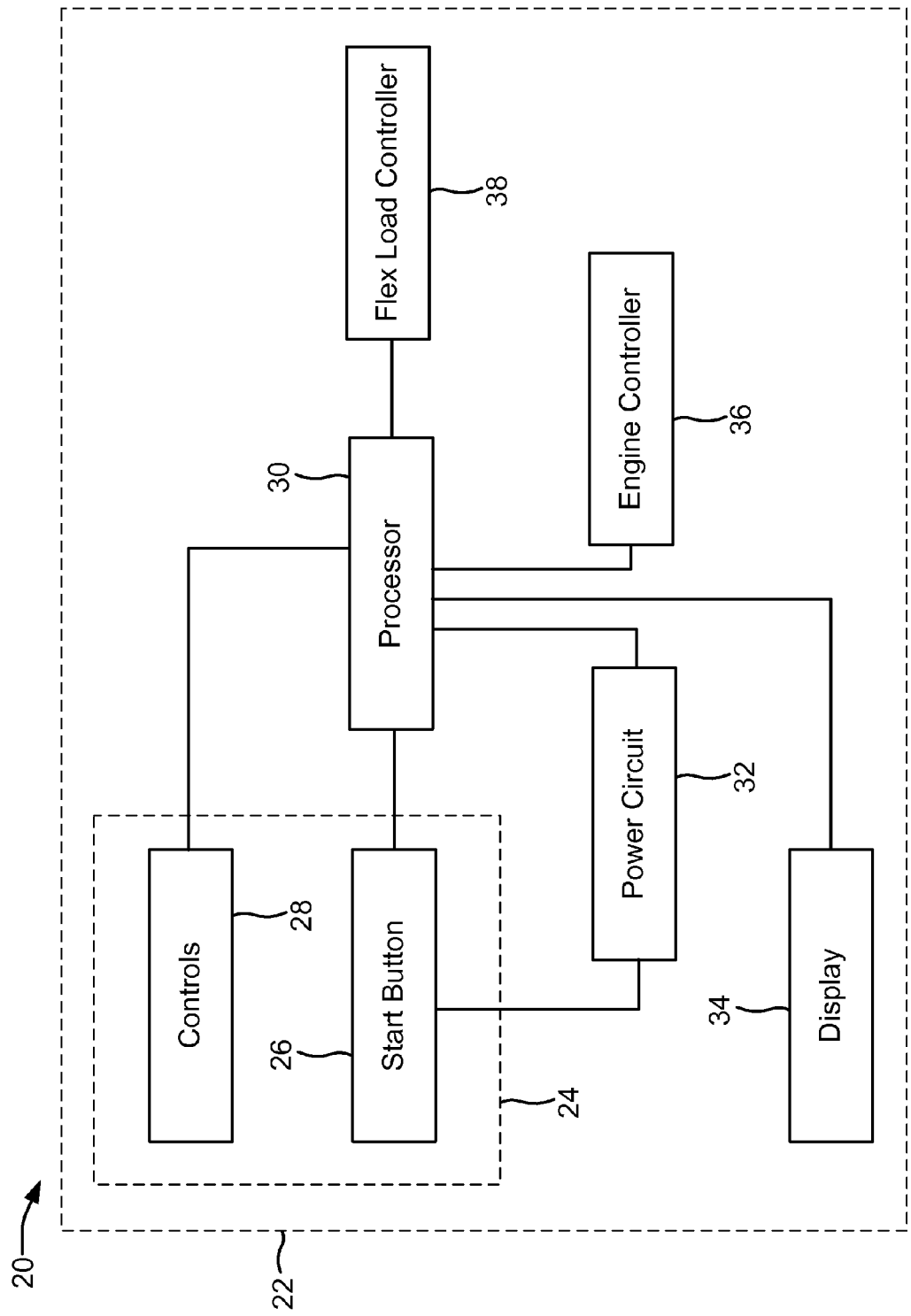
FIG. 2 is a schematicized block diagram of the keyless ignition system of FIG. 1.
Figure 3:
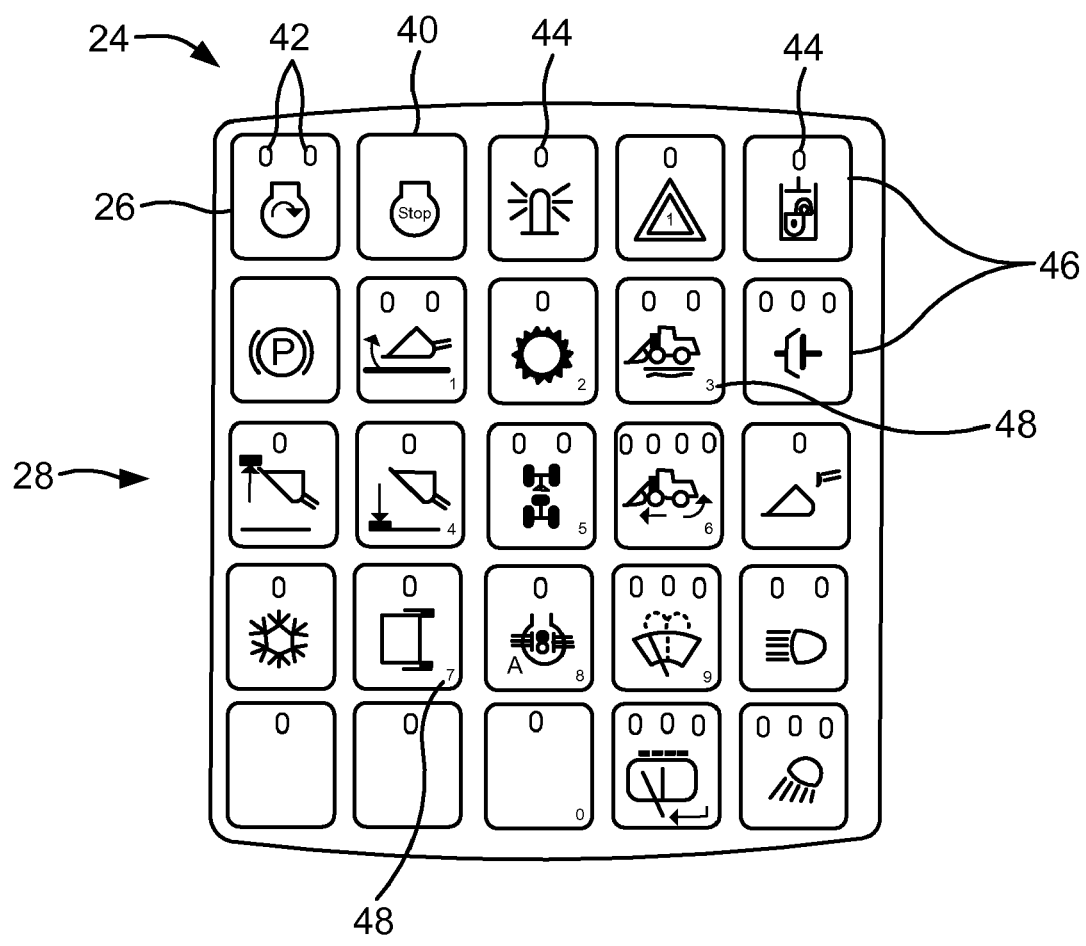
FIG. 3 is an example of a control panel utilized in the keyless ignition system of FIGS. 1-2.

Now, additionally referring to FIGS. 2-3 there is shown a control system 20 including an engine start system 22 that may integral with system 20. Control system 20 includes a control panel 24 having a start button 26 and other controls 28. Control system 20 additionally includes a processor 30, an electrical power supply circuit 32, a display 34, an engine controller 36 and a flex load controller 38. While the various elements of control system 20 are shown as all being connected to processor 30, it is also known that these components can be connected by way of a control line and address buses and FIG. 2 is utilized just for the purposes of illustrating a part of the connectivity of the various portions of control system 20. Engine start system 22 operates utilizing a method described herein after. Control panel 24 includes start button 26, which is directly connected to electrical power supply circuit 32. Start button 26 activates power circuit 32 causing the application of electrical power from power circuit 32 to the rest of control system 20. Start button 26 is also operatively connected to processor 30 and sends a signal to processor 30 when start button 26 is depressed. Processor 30 is activated when power circuit 32 supplies power thereto. Alternatively, processor 30 may be powered even before other portions of control system 20 and may have a sleep mode from which it is awakened by either application of electrical power from power circuit 32 or by way of a signal from start button 26. Display 34 is located in the operator cab of loader 10. Display 34 provides information to the operator including requests from the system for input upon control panel 24 by the operator.

Engine controller 36 may be located approximate to engine 18 and is communicatively connected to processor 30 for the receipt of instructions and for the passing of information therebetween. Engine controller 36 not only implements the instructions of engine start system 22 but also monitors engine 18 and reports to processor 30 information about engine 18 including any faults or operational data thereof.

Flex load controller 38 is shown as a separate entity from processor 30 but may be primarily a memory and may be completely integrated with processor 30. Load controller 38 processes control information relative to the operation of loader 10 apart from engine 18, which is under the control of and is monitored by engine controller 36.

Control panel 24 includes not only a start button 26 and controls 28, but also includes stop button 40, indicators 42 on start button 26 as well as other indicators 44 and other buttons 36. Some of buttons 46 include numeric values 48 thereon allowing at least some of buttons 46 to have multiple purposes.

Figure 4:
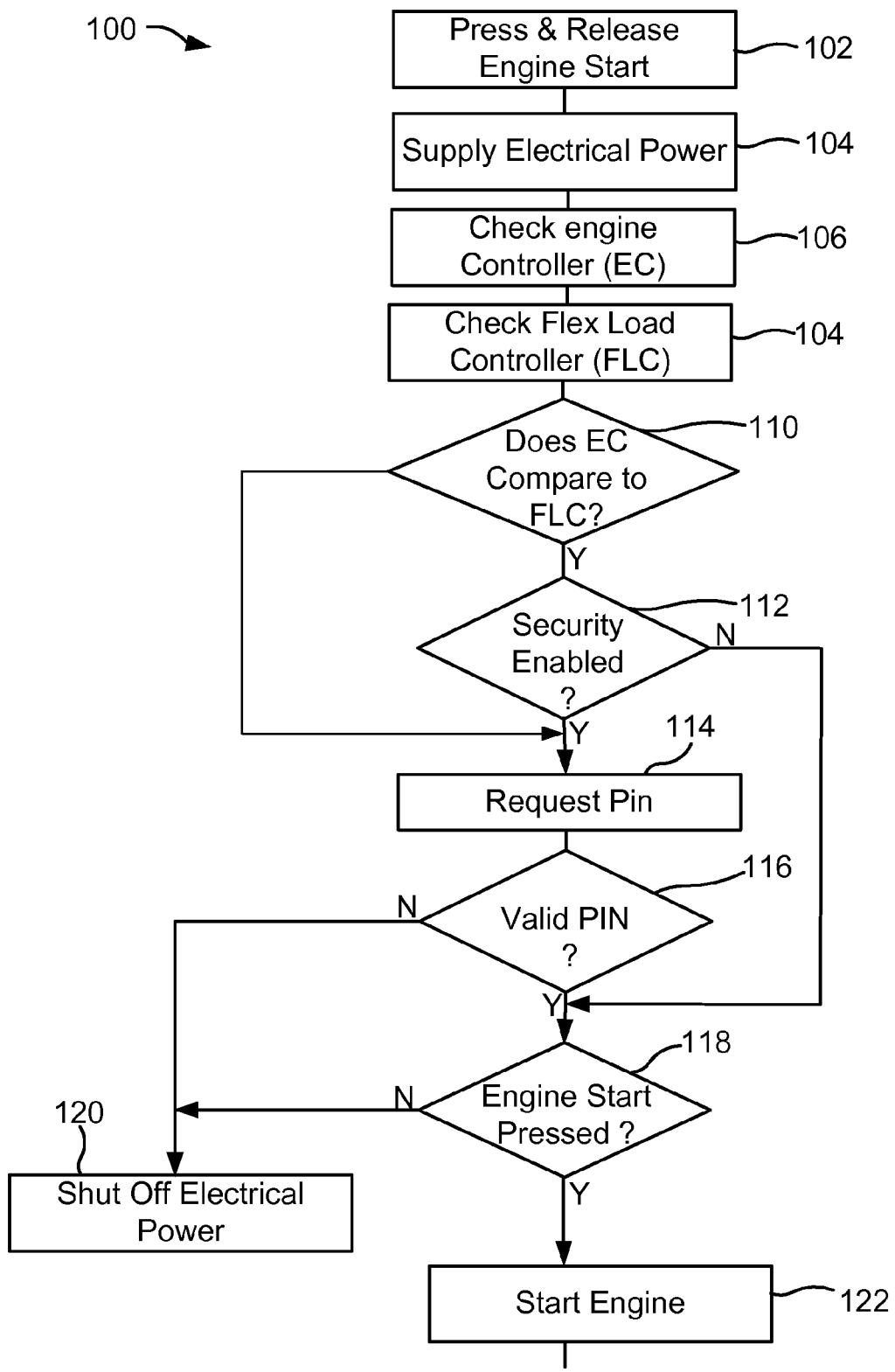
FIG. 4 depicts a method utilizing a sequence of steps of one embodiment of the ignition system used in FIGS. 1-3.

Now, additionally referring to FIG. 4, there is illustrated a method 100 that is carried out by engine start system 22. At step 102 start button 26 is pressed and released to initiate method 100. Electrical power is supplied at step 104 by power circuit 32, thereby supplying electrical power to processor 30 and to other portions of electrical start system 22. The application of electrical power to the various components of engine starting system 22 allows engine starting system 22 to come to life to process the commands for the initiation of a starting sequence of engine 18 and for the control of loader 10.

At step 106, information is received from the engine controller unit. In a similar fashion information is received at step 108 from the flex load controller. Obviously steps 106 and 108 can be preformed in either order or even in parallel. At step 110, processor 30 compares the information from engine controller unit 36 with information from flex load controller 38 to ensure that components of loader 10 have not been compromised or tampered with. For example, if someone wishing to steal loader 10 tries to place a new engine controller unit with a personal identification number (PIN) known to the thief, loader 10 due to the comparison of information from both engine controller unit 36 and flex load controller 38 will cause the method 100 to proceed directly to requiring a PIN number at step 114 or can even inactivate the machine and cause it to not function unless the information is compatible. It is not required by the present method that the information be identical but rather that the information in controller unit 36 and controller 38 would validate the information in each other, thereby determining if either controller has been tampered with or replaced.

If the information from controller units 36 and 38 indicate a lack of tampering, then method 100 proceeds to step 112, where processor 30 determines whether the security feature has been enabled. The security feature will be discussed later in greater detail. If no security level has been enabled then method 100 proceeds to step 118 to ensure that start button 26 is again pressed before the starting of engine 18 at step 122. This two step pressing of start button 26 effectively powers up the starting system with the first press and the starting of the engine occurs upon the second pressing of start button 26.

An operator will have a predetermined amount of time such as five minutes or 30 minutes to enter the PIN for validation of the operator. The information of the PIN is entered into control panel 24 by selecting buttons 46 that contain numeric values 48, which correspond to the operators PIN. If a valid PIN has been detected at step 116 then within a predetermined amount of time, such as one minute, five minutes or thirty minutes, start button 26 must be depressed at step 118 in order for method 100 to proceed to step 122 in which engine 18 is started. If the PIN is not valid then after a predetermined amount of time such as five minutes, then electrical power is shut off at step 120. In a like manner if start button 26 is not pressed, as determined by step 118, within a predetermined time such as 30 minutes then electrical power is removed at step 120.

Figure 5:
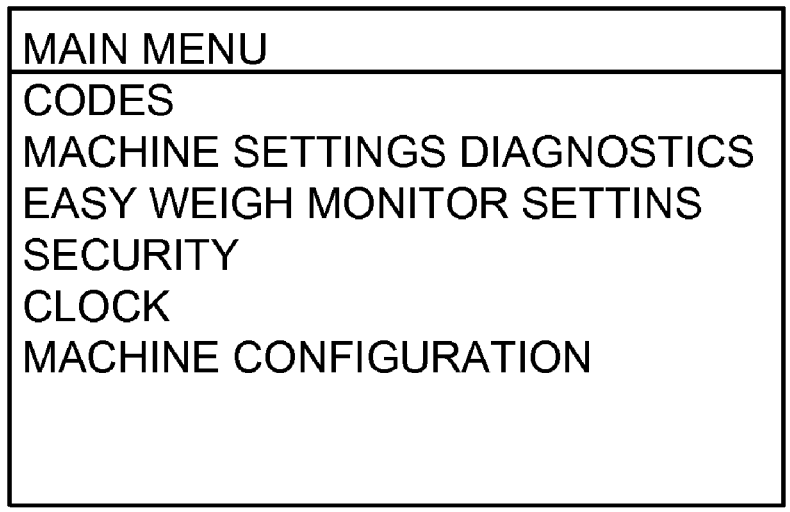
Figure 6:
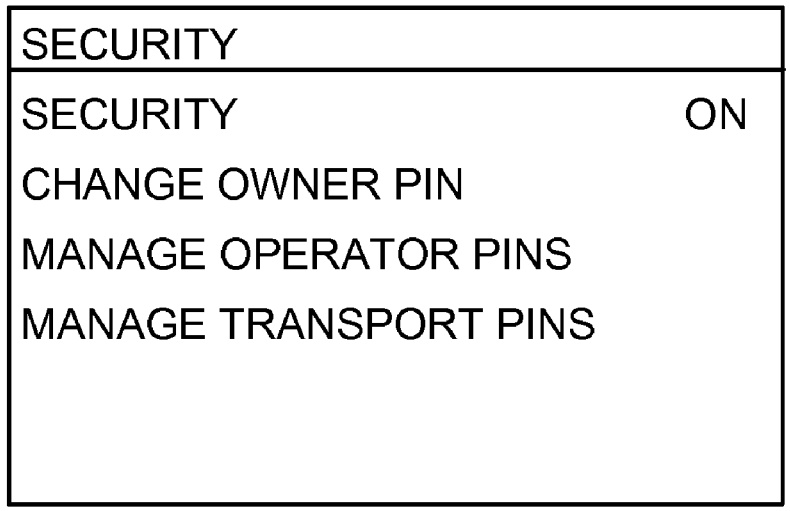

Now, additionally referring to FIGS. 5-7, there are illustrated menus that may be displayed on display 34, which allows control of the security features of loader 10. For example, FIG. 5 illustrates a main menu that is displayed upon entering of a particular PIN at step 114 to allow access to various elements of control system 20. For example, in FIG. 5 if "security" is selected then the menu entitled security, such as shown in FIG. 6, is then displayed on display 34. FIG. 6 indicates that security is "turned on" so that when method 100 is executing and it is to be determined whether security is enabled, then a memory element, in which it is stored, is queried to determine the operation of method 100. Additionally, the PIN numbers can be changed by the owner of loader 10, who has the access to peruse the menu as illustrated in FIG. 5-7. The owner may change his own PIN as well as manage multiple operator PINs and transport PINs. For example, when a manage operator PIN selection is made from the screen illustrated in FIG. 6, this leads to the screen shown in FIG. 7 in which the owner can then alter the acceptable operator PINs which may be entered to operate loader 10. Additionally, the functionality of loader 10 may be assigned by operator PINs. For example, if operator 3 is inexperienced the top speed of loader 10 may be degraded by a selection, not shown, in FIG. 7. In a similar matter, transport PINs can be assigned which in addition to having perhaps some performance degradation elements selected for loader 10, can also limit the length of time in which loader 10 may be operated. For example, a default operation for a transport PIN may allow loader 10 to be only functional for thirty minutes or one hour or some other pre-selected time, thereby preventing someone that is transporting loader 10 from extended commercial use of loader 10. A count down in the amount of time left for operation under the transport mode may be illustrated on display 34. Alternatively, loader 10 may continue to operate after the predetermined time has expired but then any starting of loader 10 will be prevented by reutilization of that PIN. Control panel 24 incorporates processor 30 and provides a way for the operator to turn on the ignition power, request engine cranking, turn off the engine, turn off ignition power and provide diagnostics if the ignition relay does not energize. The ignition relay, which is a part of power circuit 32, is energized by battery voltage supplied by the depressing of power button 26.

A controller area network (CAN) may consist of two wires and a shield that provides communications of control panel 24 and the other control elements of the system. Control system 20 controls the illumination of indicators 42 and 44 for feedback to the operator. Indicators 42 and 44 may be lighted in a solid on, or off condition as well as a blinking condition that may indicate a need for attention relative to the various elements represented by the icons on buttons 46.

Although not illustrated a brake pedal sensor may indicate by way of a transmission controller the position of the brake pedal. The transmission controller can broadcast the position of the brake pedal, as sensed by the brake pedal sensor, by way of the CAN to control system 20 to be utilized in the start sequence. Alternatively, a particular sequence of operations, which may include input on control panel 24 that are read by processor 30, can be used to allow access to various functions of control system 20. For example, the engine may not start unless both the start button 26 and the brake pedal are depressed within a predetermined time. In order to stop the functioning of engine 18 stop button 40 may be depressed to command the shutdown of the engine as well as a de-energizing of control system 20. Control system 20 includes diagnostics to determine a failure of the ignition relay. For example an indicator 42 may blink indicating problem with the relay.

The present invention has various advantages in that not only the diagnostics of the relay circuit is undertaken but diagnostics of why the machine has failed to crank. The system has the flexibility to turn off the engine without turning off ignition power. Other advantages are that no key switch warranty is needed since no keys are required for the operation of loader 10. Levels of security and numerous different pass codes in the form of PINs can be programmed into this system for controlled access for loader 10. Diagnostics from engine controller 36 can be utilized in control system 20 to inform the operator of the condition of loader 10. Since shutting down of the engine is under the control of control system 20 the engine can be shut down in a controlled manner, which can include going through a speed reduction sequence prior to eliminating the ignition power or supply of fuel to engine 18. The system additionally allows the flexibility to require an operator to test various controls, such as a brake pedal, the horn, to make sure that the compartment door is closed, lights are turned on or off before the machine will crank, this helps to assure the machine is in a safe state prior to starting. Alternatively, the system can be programmed to have no security feature allowing a mere pressing of the button to start the system.

Having described the preferred embodiment, it will become apparent that various modifications can be made without departing from the scope of the invention as defined in the accompanying claims.

What is claimed is:

1. An engine start system for use with a ground engaging vehicle, the system comprising:
   an input device producing a signal when depressed, said signal initiating an application of electrical power to the system;
   a processing circuit being activated by one of said signal and said application of electrical power;
   an engine controller; and
   a memory containing data, said processing circuit receiving at least a portion of said data from said memory, said processing circuit receiving information from said engine controller, said information and said at least a portion of said data being compared by said processing circuit to determine whether both said memory and said engine controller have not been tampered with or replaced.

2. The engine start system of claim 1, further comprising a display communicatively connected to said processing circuit, said input device produces an other signal when depressed, said other signal being detected by said processing circuit, said processing circuit in response to said other signal sending one of a Personal Identification Number (PIN) request notice to said display and a start signal to said engine controller unit.

3. The engine start system of claim 2, wherein said other signal is substantially the same as said signal.

4. The engine start system of claim 2, wherein said processing circuit in response to said other signal sends said PIN request notice to said display.

5. The engine start system of claim 4, wherein said processor receives PIN input information from said input device, said PIN input information is compared to at least one of said information from said engine controller unit and said at least a portion of said data to validate said PIN input information.

6. The engine start system of claim 5, wherein said processor sends said start signal to said engine controller unit dependant upon valid PIN input information.

7. The engine start system of claim 1, wherein said processing circuit is configured to prevent the engine from starting if at least one of said memory and said engine and controller has been tampered with or replaced.

8. An engine start system for use with a ground engaging vehicle, the system comprising:
   an input device producing a signal when depressed, said signal initiating an application of electrical power to the system;
   a processing circuit being activated by said application of electrical power;
   a display communicatively coupled with said processing circuit; and
   an engine controller unit, said input device producing an other signal when depressed, said other signal being detected by said processing circuit, said processing circuit in response to said other signal sending one of a Personal Identification (PIN) request notice to said display and a start signal to said engine controller unit, said processing circuit being configured to preclude the engine from starting if said other signal is indicative of said engine controller unit being tampered with or replaced.

9. The engine start system of claim 8, further comprising a memory containing data, said processing circuit receiving at least a portion of said data from said memory, said processing circuit receiving information from said engine controller unit, said information and said at least a portion of said data being compared by said processing circuit to determine whether the system has been tampered with.

10. The engine start system of claim 8, wherein said other signal is substantially the same as said signal.

11. The engine start system of claim 8, wherein said processing circuit in response to said other signal sends said PIN request notice to said display.

12. The engine start system of claim 11, wherein said processor receives PIN input information from said input device, said PIN input information is compared to at least one of said information from said engine controller unit and said at least a portion of said data to validate said PIN input information.

13. The engine start system of claim 12, wherein said processor sends said start signal to said engine controller unit dependant upon valid PIN input information.

14. The engine start system of claim 8, wherein said processing circuit does not detect said signal, but is only activated as a result of said signal.

15. A ground engaging vehicle, comprising:
   a frame;
   an engine connected to said frame; and
   an engine start system operatively connected to said engine, said engine start system including:
      an input device producing a signal when depressed, said signal initiating an application of electrical power to the system;
      a processing circuit being activated by said application of electrical power;
      an engine controller unit; and
      a memory containing data said processing circuit receiving at least a portion of said data from said memory, said processing circuit receiving information from said engine controller unit, said information and said at least a portion of said data being compared by said processing circuit to determine whether at least one of said memory and said engine controller has been tampered with or replaced.

16. The ground engaging vehicle of claim 15, further comprising a display communicatively connected to said processing circuit, said input device produces an other signal when depressed, said other signal being detected by said processing circuit, said processing circuit in response to said other signal sending one of a Personal Identification Number (PIN) request notice to said display and a start signal to said engine controller unit.

17. The ground engaging vehicle of claim 16, wherein said other signal is substantially the same as said signal.

18. The engine start system of claim 16, wherein said processing circuit in response to said other signal sends said PIN request notice to said display.

19. The engine start system of claim 18, wherein said processor receives PIN input information from said input device, said PIN input information is compared to at least one of said information from said engine controller unit and said at least a portion of said data to validate said PIN input information.

20. The engine start system of claim 19, wherein said processor sends said start signal to said engine controller unit dependant upon valid PIN input information.

* * * * *